United States Patent [19]
Hendrickson et al.

[11] Patent Number: 5,933,646
[45] Date of Patent: Aug. 3, 1999

[54] SOFTWARE MANAGER FOR ADMINISTRATION OF A COMPUTER OPERATING SYSTEM

[75] Inventors: B. Winston Hendrickson, San Jose; Gregory Scown, Sunnyvale; James E. Palmer, Redwood City; Robert Bowers, Cupertino; Jeffrey R. Cobb, Sunnyvale, all of Calif.

[73] Assignee: Apple Computer, Inc., Cupertino, Calif.

[21] Appl. No.: 08/644,411

[22] Filed: May 10, 1996

[51] Int. Cl.⁶ .................................................. G06F 9/44
[52] U.S. Cl. ...................... 395/712; 395/200.51; 395/653
[58] Field of Search .................................... 395/712, 651, 395/652, 653, 200.51, 200.52, 200.5, 701, 703

[56] References Cited

U.S. PATENT DOCUMENTS

| 4,558,413 | 12/1985 | Schmidt et al. | 395/712 |
| 5,619,716 | 4/1997 | Nonaka et al. | 395/712 |
| 5,666,501 | 9/1997 | Jones et al. | 395/712 |

OTHER PUBLICATIONS

Henry Norr, "God Awful, Unholy Mess", *MacWeek*, Oct. 2, 1995.

Henry Norr, "The Second Decade Henry Norr", *MacWeek*, Nov. 6, 1995.

Don Crabb, "Getting back to basics: The Mac OS needs help", *MacWeek*, Oct. 16, 1995.

*Primary Examiner*—Kevin A. Kriess
*Attorney, Agent, or Firm*—Burns, Doane, Swecker & Mathis, L.L.P.

[57] ABSTRACT

A software manager enables a computer user to administer software elements within a computer operating system. The software manager comprises a configuration database storing information including a prevailing state and a dependency listing for each of the software components within the system. The software manager also comprises a user interface which allows the computer user to view the stored information and permits the user to specify changes to the prevailing states. Finally, the software manager comprises a software manager server which communicates with the user interface and the configuration database, effects the user specified changes, and updates the stored information to reflect those changes. A user of the software manager can readily obtain an overall "picture" of a prevailing system configuration, use that picture to make intelligent decisions with respect to system modification, and thereby administer the operating system environment in a seamless, efficient, and robust manner.

20 Claims, 4 Drawing Sheets

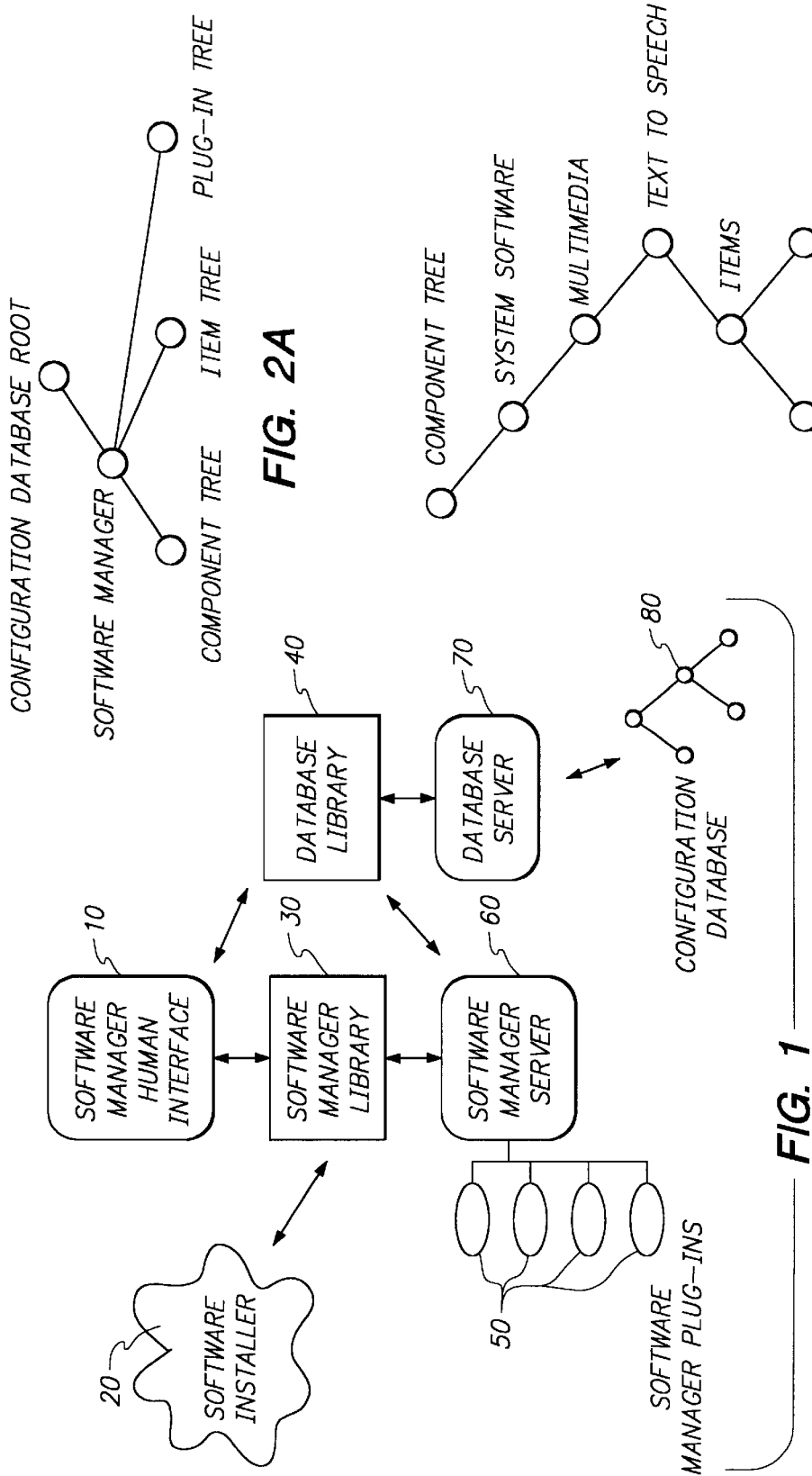

SOFTWARE MANAGER FOR ADMINISTRATION OF A COMPUTER OPERATING SYSTEM

FIELD OF THE INVENTION

The present invention relates to computer operating systems, and more particularly to configuration and management of software components within a computer operating system.

BACKGROUND OF THE INVENTION

Some of the routine tasks that accompany ownership or use of a personal computer include installing and upgrading software, determining the types of software already installed and enabled on a given computer system, removing old or unused software, and ascertaining the reasons that certain software features are non-functional. Given the regularity and importance of these tasks in everyday computer operation, a typical computer user desires an operating system that provides an easily understandable and manageable means for setting up and maintaining a computer working environment. However, because ever-growing complexities in new software products have far out-paced advances in available system configuration tools, the user experience currently associated with the above described tasks may be less than desirable. Some existing system management techniques confront the user with an error-prone environment that is virtually unmanageable, absent expert assistance. Furthermore, the present lack of a consistent, coherent approach to cataloging and maintaining the various elements that make up an operating environment often results in inconsistent system behavior, significant system performance degradation, and inefficient use of hardware resources. Unchecked, this situation will worsen as more sophisticated software products are released. This can lead, in turn, to additional user frustration and increased requirements for customer support.

For purposes of better understanding the problems associated with prior art configuration management tools, it is instructive to consider the basic structural layout of a typical computer operating system. In any such operating system, there exists a collection of program code and associated data representing the presently active system software. Such code and data are typically stored on a disk in some form of system file or system file directory. Traditional system administration has meant the direct manipulation of the contents of such system file(s). However, as the complexity and versatility of system and application software has increased over time, the number of items that must be managed has grown to an unwieldy level. Further complicating matters is the fact that many software components depend, either completely or partially, upon some portion of system file content. For example, when some application programs are launched, they scan the content of the system files searching for data or software code which might be required for either basic or enhanced operation. As a result, removal or alteration of system file content by the user can cause latent problems in seemingly unrelated software processes. The typical system user therefore ends up treating the system files as a mysterious and impenetrable "black box" from which nothing can be removed.

Such a situation is extremely problematic, as users routinely wish to add to, delete from, and otherwise modify operating system functionality. For example, a user may wish to upgrade an existing word processing application by installing a spell checker that was not originally installed due to an earlier-existing, but now alleviated, disk space constraint. Another user may wish to add a new font or remove an obsolete printer driver. Yet another user might wish to disable certain operating system functionality without fear that other aspects of the environment will be adversely affected. Given conventional configuration management tools, however, such users cannot readily execute these modest tasks. This is due to the fact that the prior art tools provide no means by which a user can easily ascertain the interdependencies that many times exist between system components, and hence the user is not presented with a coherent, easily graspable view of the prevailing overall configuration. In sum, there is a very real need for a computer operating system in which environment configuration and management is efficient, consistent, easy to understand, and aligned more closely with typical user expectations associated with buying, installing, and using personal computing software.

SUMMARY OF THE INVENTION

The present invention fulfills the above-described and other needs by providing a software manager which enables a computer user to easily administer software components within a computer operating system. The software manager consists of a configuration database, a user interface, and a software manager server.

The configuration database stores information which includes a prevailing state associated with each of the software components in the operating system. The prevailing state may indicate, for example, whether or not the given component is presently installed and enabled, or where the given component is located within a hierarchical filing structure associated with the operating system. The configuration database also stores a dependency listing for each of the software components. The dependency listing may indicate, for example, any interdependencies existing between the given software component and other components, or between the given software component and portions of the system files.

The software manager user interface permits the computer user to view the information that is stored in the configuration database. In other words, the user can readily observe the prevailing status of each software component in the system, as well as any interdependencies which exist between and among those components. In one embodiment, the user is able to view the system as a collection of logical groupings, wherein related software elements are grouped together according to category and type. In another embodiment, the user is able to view the system as a collection of software products, each product comprising a collection of associated software features.

The software manager user interface also permits the user to specify any changes the user might wish to make in the prevailing system configuration. Such changes might include, for example, enabling or disabling installed software components, installing new software components, de-installing old or unused software components, or moving components within the hierarchical filing structure of the operating system.

The software manager server communicates with both the user interface and the configuration database. The server carries out any user-specified changes and updates the configuration database to reflect those changes. Thus, a user of an operating system constructed in accordance with the teachings of the present invention can readily obtain an overall "picture" of a prevailing system configuration, use that picture to make intelligent decisions with respect to system modification, and thereby administer the operating environment in a seamless and robust manner.

In one exemplary embodiment, the software manager of the present invention also comprises a set of software manager plug-ins that provide an interface between the software manager server and various software components within the operating system. Such plug-ins permit the software components to request and receive notification of certain changes in the information stored in the configuration database. The software components are then able to adapt as necessary in response to those changes. For example, software elements which require access to system file content can request that information from the software manager server, and thereby avoid time-consuming run-time scans of the system files.

Further features of the present invention are explained hereinafter with reference to the illustrative examples shown in the accompanying drawings.

BRIEF DESCRIPTION OF THE DRAWINGS

FIG. 1 depicts a software manager for administering components in a computer operating system, in accordance with the teachings of the present invention.

FIGS. 2a–2d depict contents of a configuration database constructed in accordance with the teachings of the present invention.

DETAILED DESCRIPTION OF THE PREFERRED EMBODIMENTS

To facilitate an understanding of the present invention and the advantages offered thereby, features of the invention are often described and illustrated with reference to the use of the invention in a computer running the Macintosh® operating system developed by Apple Computer, Inc. It will be appreciated by those having familiarity with the relevant technology, however, that the principles of the present invention are not limited to this particular type of operating environment. Rather, the concepts which underlie the invention are applicable to any type of computer operating environment in which it is desirable to provide a user-friendly method of system administration.

Introduction

Figure 6:
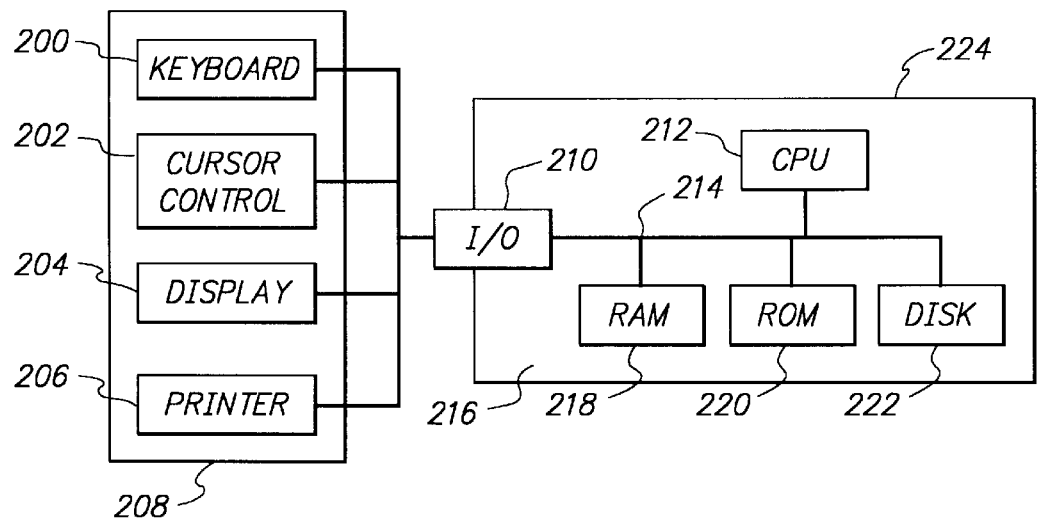
FIG. 6 is a block diagram of the main components of a computer system.

A typical computer system, of the type in which the present invention can be employed, is illustrated in block diagram form in FIG. 6. The structure of the computer itself does not form part of the present invention. It is briefly described here for subsequent understanding of the manner in which the features of the invention cooperate with the structure of the computer. Referring to FIG. 6, the system includes a computer 224 having a variety of external peripheral devices 208 connected thereto. The computer 224 includes a central processing unit 212, a main memory which is typically implemented in the form of a random access memory 218, a static memory that can comprise a read only memory 220, and a permanent storage device, such as a magnetic or optical disk 222. The CPU 212 communicates with each of these forms of memory through an internal bus 214. The peripheral devices 208 include a data entry device such as a keyboard 200, and a pointing or cursor control device 202 such as a mouse, trackball or the like. A display device 204, such as a CRT monitor or an LCD screen, provides a visual display of the information that is being processed within the computer, for example the contents of a document. A hard copy of this information can be provided through a printer 206, or similar such device. Each of these external peripheral devices communicates with the CPU 212 by means of one or more input/output ports 210 on the computer.

Generally speaking, the present invention comprises a software manager which vastly improves computer operating system configuration management by allowing a user to view and manipulate high-level software elements. The present invention thus enables a user to look beyond the individual pieces of the system to see the interrelationships between system elements and to gain an understanding of overall functional system composition. In one exemplary embodiment, a user is presented with an interface to the software manager anytime he or she attempts to access or move the system files, or anytime he or she attempts to install additional software. Alternatively, the user can access the interface to the software manager directly by specifically launching a software manager application. By channeling system configuration activity through the software manager, an operating system constructed in accordance with the present invention provides a comprehensive approach to system administration that is efficient, consistent, and easily understood by the typical user.

Further toward that end, the software manager of the present invention allows a user to obtain useful information regarding installed software elements (e.g., program size and function, version number, enabled/disabled status, resource requirements, installation date, vendor information, etc.), and allows a user to enable, disable, install, de-install, move, and otherwise modify elements as appropriate. The software manager also tracks dependencies between software elements so that a user may obtain information regarding the impact a given change might have on overall system integrity. In one embodiment, the software manager allows a user to update an existing partial installation of a given software element (e.g., the user may wish to re-execute an installer routine associated with a word processor in order to add a spell checker), or return to a core installation associated with a software element (e.g., the user may wish to delete unused features associated with a database program in order to conserve disk space).

In the software manager of the present invention, the operating system software residing in the system files is treated as a collection of core modules each having an associated set of dependent plug-in modules. A core module is a stand-alone software element, containing the essential features of a particular system function or service. A plug-in module, on the other hand, constitutes only one piece of a broader system function or service and relies upon a parent core module for proper operation. Such a plug-in is optionally present in the operating system and is located dynamically by its parent at computer run-time. As is described in more detail below, a user of the software manager can obtain an organized system view of the system file content in which the available core and plug-in modules are displayed in coherent groupings by category and type. For example, if a user wishes to see all printer drivers in a given system, the user could select the category "printing" and the item "printer drivers" within the software manager system view.

Shifting from system software to application software (i.e., that software which enables a user to perform some end goal beyond basic computer operation), an analogy to core and plug-in modules can be drawn. Specifically, a software product (e.g., a word processor, or a database program) is analogous to a system core module, and a software "feature" (e.g., a spell checker, or a data plotting routine) is analogous to a system plug-in. Thus, an independent application product may comprise a collection of related dependent features. Preferably, in keeping with the goal of providing a simplified system administration experience for the user, only those software elements having a clear and understandable functional end use from the perspective of the user (as opposed to an internal system operating purpose) are presented to the user as products or features. More specifically, a product corresponds to a program that a user might buy or receive on a portable diskette, and represents a unit concept of functionality which may consist of multiple features. The subordinate features may be either indispensable functional elements or optional elements which the user may wish to enable and disable intermittently. To assist the user in administering such products and features, the software manager allows the user to obtain a "products and features" view of the system. In such a view, the user might see, for example, that a particular word processor product is installed (and available) and that a specific associated dictionary feature is not presently installed. In such case, the user might choose to install the dictionary feature directly from the software manager products and features view.

In addition to providing a user-friendly method of system administration, the present invention also provides valuable services to those software entities, including core modules, plug-ins, products, and features, that rely on the content of the system files. The software manager provides such entities with means for specifying any system content in which they are interested (i.e., by which they are affected). Such storage is persistent across successive shut-downs and start-ups of the system so that the interested software entities can avoid time-consuming start-up scans of the system files prior to their operation to locate items of interest. The software manager provides notification to these entities when their associated system file content is created, deleted, or moved, so that they can respond accordingly. For example, After Dark is a commercial application available for Apple Macintosh® computers which offers users a number of options for animated screen savers. In a system utilizing the software manager of the present invention, the After Dark software could register with the software manager, as described below, to receive notifications with respect to installations and deletions of screen saver modules. Thus, if a user were to launch the After Dark application, the After Dark software could quickly present that user with a choice of available screen saver options without first having to search the system files to determine which screen saver modules are present on the system.

Further advantages of the present invention are made clear by the following detailed description of an exemplary embodiment of the software manager. Throughout the discussion, the generic terms "component", "entity", and "element" are used to describe various software items. Whether such an item is a core module, a plug-in, a product, a feature, or a file will be apparent from the context of the discussion.

Overall Software Manager Architecture

As shown in FIG. 1, one embodiment of the software manager comprises a software manager user interface 10 in communication with a software manager library 30 and a database library 40. The database library 40 is in communication with a database server 70, which is in turn in communication with a configuration database 80. The software manager library 30 is in communication with a software manager server 60 which is in turn in communication with both the database library 40 and a collection of software manager plug-in modules 50.

Generally speaking, the software manager stores information in the configuration database 80 describing the available software components and delineating any interrelationships existing between the components (or between the components and the system file content). The software manager updates the configuration database 80 as changes in the prevailing operating environment are made. Such changes include installations of new software via a software installer 20, manipulations of system file content by a user (e.g., movement of a system file within the hierarchical filing structure of the operating system), and modifications in software component status made by a user directly through the software manager user interface 10.

To assist a system user in managing the operating environment, the user interface 10 uses the information stored in the configuration database 80 to present the user with various "system" or "product and feature" views of the prevailing configuration. The user may launch the user interface 10 directly (e.g., by pointing to and clicking on an appropriate icon in a windowing environment) or indirectly (e.g., by attempting to access the contents of the system files, or by attempting to install additional software via an installer routine 20). By compelling the user to conduct system administration activities through the software manager, and by providing the user with pertinent, easily understandable information regarding system configuration, the present invention allows a user to seamlessly administer the operating environment with minimum risk of corrupting overall system integrity.

Software Manager Server

The software manager server 60 is directly responsible for detecting changes in the operating environment and indirectly responsible for updating the configuration database 80 to reflect any such changes. With respect to detecting changes in the operating environment, the software manager server 60 distinguishes between at least three different types of change. First, the software manager server detects changes resulting from installation of new software. Toward that end, the software manager server 60 is in communication with operating system and application installer routines 20 as shown in FIG. 1. Second, the software manager server 60 detects changes resulting from user manipulation of the system files. To accomplish this, the software manager server 60 registers with a hierarchical file system server within the operating system for notification of modifications made to the system files. Such a notification arrangement is well known in the prior art and is not described in detail here. Third, the software manager server 60 detects changes requested by the user via the software manager user interface 10. The software manager server 60 detects such changes through its communication with the user interface 10 via the software manager library 30. This library includes a collection of callable software routines used by the software server 60 to access the user interface 10, and vice versa. In addition to detecting a requested change and updating the configuration database 80 accordingly, the software manager server also effects the requested change by notifying the appropriate system software components.

To provide such notification, and to update the configuration database 80 to reflect environment changes, the software manager server 60 utilizes a collection of software manager plug-in modules 50. Each plug-in module 50 is associated with a software component existing within the operating environment and provides information to the software manager server 60 describing the hierarchical relationship between that software component and other software components in the system. Each plug-in 50 also provides a listing of system file content by which its associated software component is affected and registers with the software manager server 60 for notification of changes in such system file content. The software manager server 60 passes the information provided by the plug-ins to the database server 70 via the database library 40. This library includes a collection of callable software routines used by the software server 60 to access the database server 10, and vice versa. The database server 70 stores the information in the configuration database 80 in accordance with instructions provided by the software manager server 60. When the software manager server 60 detects a change in the operating system configuration, it notifies the appropriate plug-ins 50 which in turn notify their associated software components and update their respective portions of the configuration database 80.

A plug-in module 50 provides the above described information to the software manager server 60 when its associated software component is first installed. Thus, the provider of a given software component is responsible for also providing a compatible plug-in containing the appropriate information. Certain plug-ins 50 exist when the computer is originally shipped, as they are associated with core system modules that are required for fundamental computer operation. Other plug-ins 50, however, are added later when, for example, a new software product is purchased and installed within the computer operating environment.

Software Manager Configuration Database

Figure 2C:
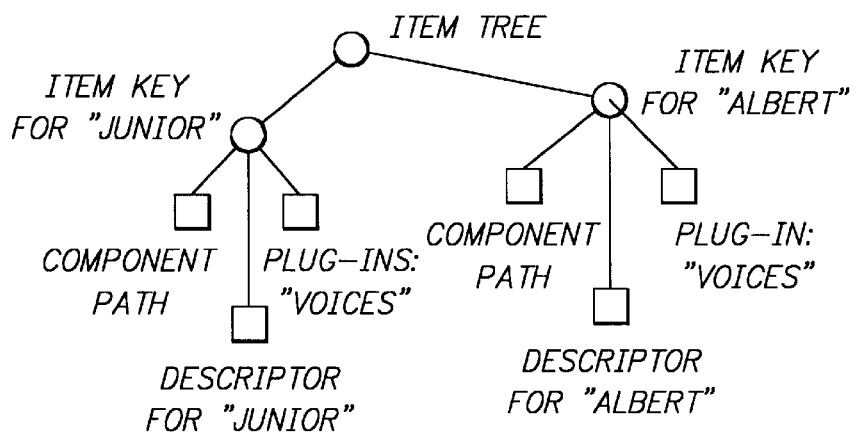
Figure 2D:
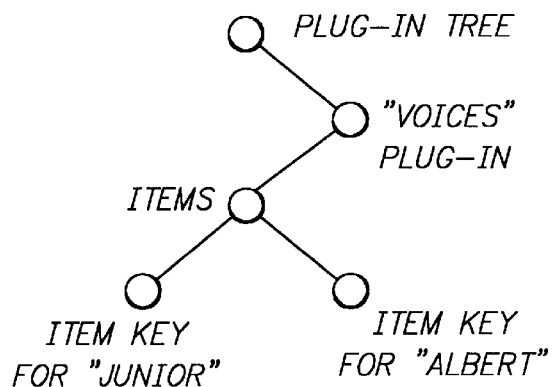

The software manager uses the configuration database server 70 and library 40 for persistent disk-based storage of the configuration database 80. As shown in FIG. 2a, the overall software manager database, or data tree, is actually comprised of three sub-trees: a component tree, an item tree, and a software manager plug-in tree. FIGS. 2b–d provide example layouts of a component tree, an item tree, and a software manager plug-in tree, respectively. Those trees are populated for two software items (labeled "Albert" and "Junior") which are part of a "Voices" plug-in to a "Text to Speech" core module. For ease of understanding, the data trees in the figures are not fully populated, and contain only the branches pertinent to this discussion.

The component tree is used to maintain information regarding the hierarchy of installed software components (e.g., system core and plug-in modules, and application products and features). Referring to FIG. 2b, the hierarchical relationship between a "System Software" core module and the "Albert" and "Junior" items is defined, including all intermediate modules. The item tree, shown in FIG. 2c, is used to maintain information regarding properties of the items tracked by the software manager plug-ins 50. An item in the item tree might also include a backlink to where a given item falls within the component tree, so that the software manager can show the user where a given component was originally installed from. For example, referring to FIG. 2c, the "Albert" item has an associated "Component Path" property (i.e., a backlink describing its path within the component tree), a "Plug-ins: Voices" property (indicating that "Albert" is associated with the "Voices" plug-in module), and a "Descriptor" property which describes various aspects of the item "Albert" (e.g., its location within a hierarchical filing structure). Similar properties are stored for the "Junior" item.

The software manager plug-in tree is used to maintain information regarding the software manager plug-ins 50. For example, referring to FIG. 2d, one sees that the items "Junior" and "Albert" are associated with the "Voices" plug-in module.

Software Manager Plug-ins

As described above, software manager plug-ins 50 are system plug-ins to the software manager which store and retrieve data in the configuration data tree 80 via the software manager server 60. Software manager plug-ins 50 also register with the software manager server 60 for notification that system files of a given type (or containing a given type of information) have been modified (e.g., enabled, disabled, added, deleted, or moved). The most basic software manager plug-in module includes four functional routines: ItemEnters, ItemExits, EnableItem, and DisableItem. These routines are called by the software manager server 60 in order to carry out the functions described above. When the ItemEnters routine is called, the plug-in creates entries in the database trees for components associated with that plug-in and the arriving (newly added) item. When the ItemExits routine is called, the plug-in removes entries in the database trees for components associated with that plug-in and the departing (removed) item. When the EnableItem routine is called, the plug-in enables the relations in its portions of the database trees that are associated with the enabled item. Finally, when the DisableItem routine is called, the plug-in disables the relations in its portions of the database trees that are associated with the disabled item. Other basic software manager plug-in routines might include GetFileTypes (returning system file types the plug-in is interested in), GetPluginID (returning a plug-in ID associated with the plug-in), GetPluginName (returning a text-object name of the plug-in), and GetPluginDescription (returning a text-object description of the plug-in).

Software Manager User Interface

As described above, the software manager user interface 10 is invoked when a user attempts to access system file content, or attempts to install new software via an installer routine 20, or intentionally launches the software manager application. In one embodiment, the products and features view mentioned previously is the initial view presented to the user. In that embodiment, the system view, also mentioned previously, is accessible through the products and features view.

Figure 3A:
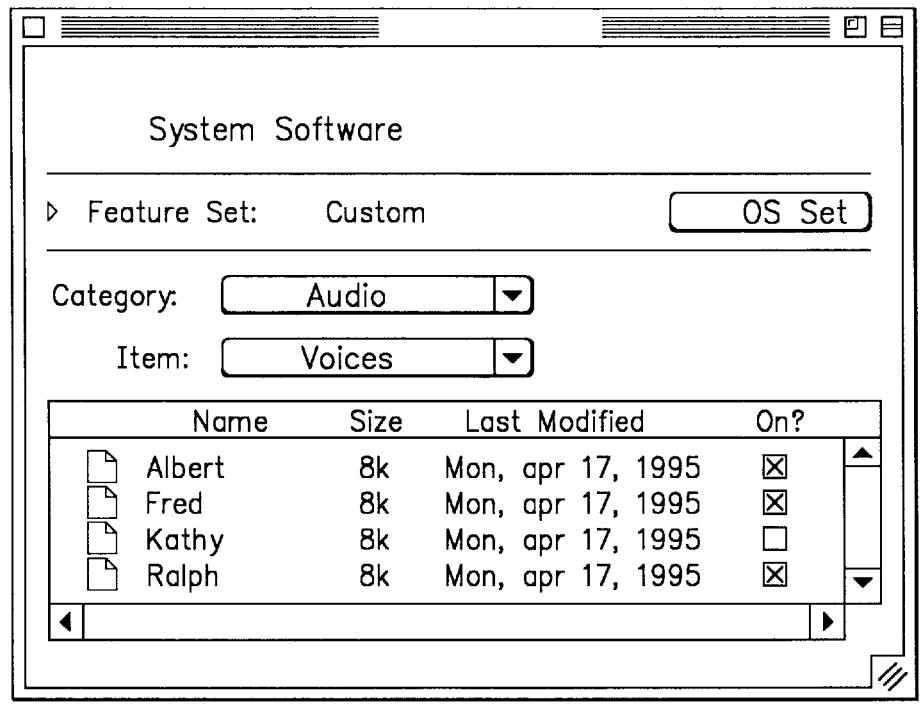
FIGS. 3a–3b depict, respectively, first and second outputs of a user interface constructed in accordance with the teachings of the present invention.
Figure 3B:
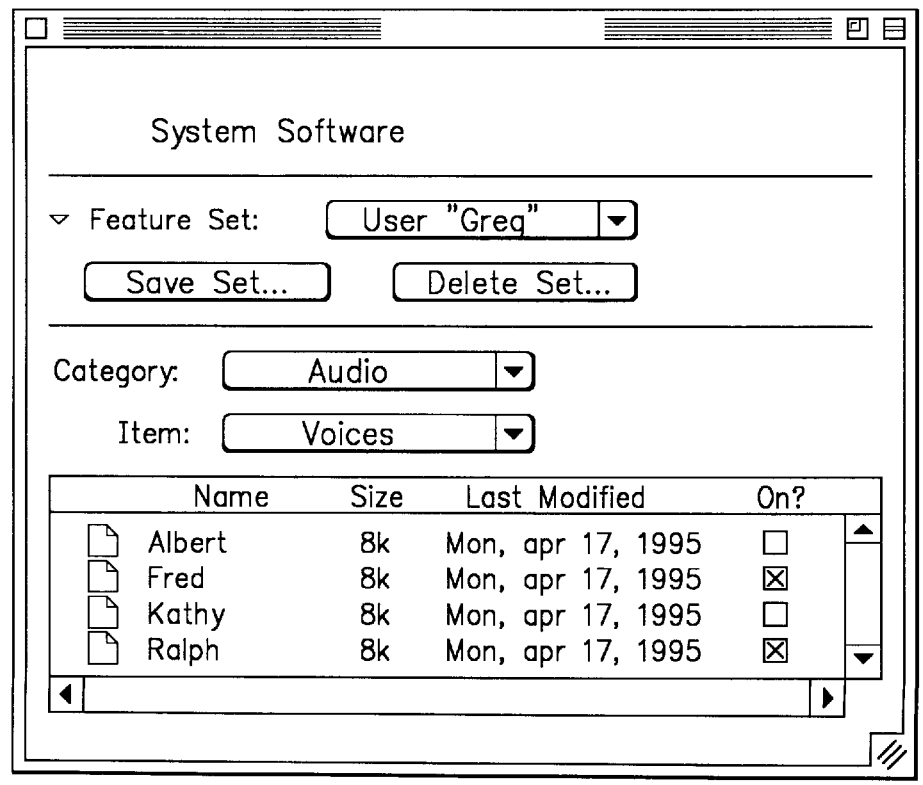

The system view presents the system files in logical groupings of the elements contained therein. For example, on a computer running the Macintosh® operating system, the system view might display categories within the System Folder such as Printing, Networking, and Fonts. Each of these categories might have a number of associated sub-categories (for example, an Audio category might contain sub-categories Sounds and Voices). Under each category or sub-category, the system view presents the user with a listing of items of the given type, and permits the user to execute various operations (e.g., enable, disable, or delete an item). The user can also request information regarding a particular item (e.g., the item's relationship to other items in the product/feature hierarchy). FIGS. 3a–b depict illustrative system container views for Voices-type items within the Audio system category. Note that in the feature set "Custom" of FIG. 3a, the "Albert" item is enabled. In contrast, in the feature set "User Greg" of FIG. 3b, the "Albert" item is disabled.

Figure 4:
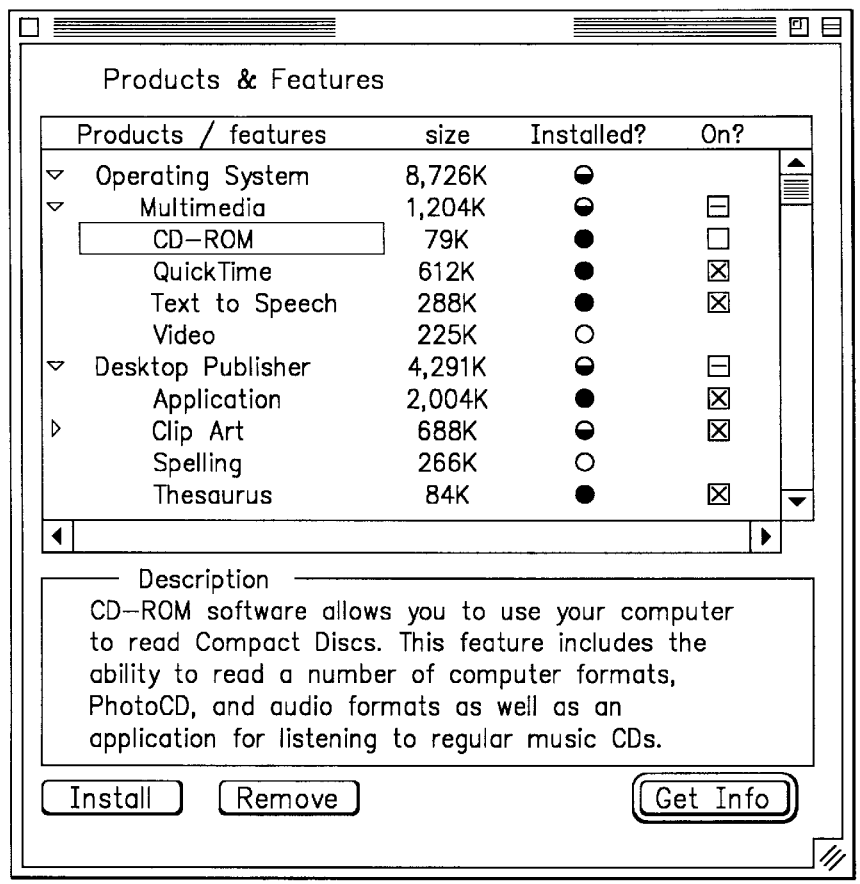
FIG. 4 depicts a third output of a user interface constructed in accordance with the teachings of the present invention.

The products and features view of the software manager allows a user to look at the computer system in terms of groupings of related features. Thus, a user can install, remove, enable, and disable software features as appropriate. The user can also get pertinent information about a given feature. FIG. 4 depicts an illustrative products and features view. Note, for example, that "CD-ROM" and "Text to Speech" are presented as features related to a "Multimedia" product.

Multiple System Users

Some computer systems provide for multiple user environments on a single computer. In such systems, each separate environment can be specially tailored to meet the needs of a particular user. In that context, the software manager of the present invention can be configured so that each user can independently administer his or her own operating environment. Toward that end, the software manager maintains, in addition to a "global" configuration database describing software components available in the overall system, listings of particular components that are enabled or disabled for each user. The software manager can then construct an ephemeral data tree, applicable only to a current user, by filtering the global tree.

Figure 5:
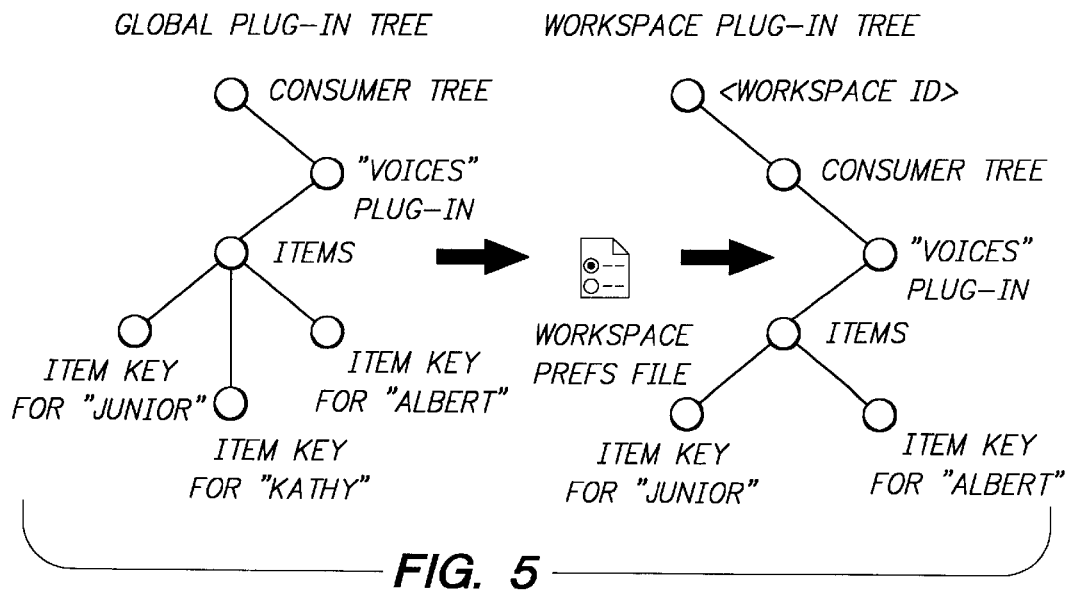
FIG. 5 depicts a filtering of a configuration database in accordance with a user-defined set of operating environment preferences, said filtering being performed in accordance with the teachings of the present invention.

Referring to FIG. 5, for example, an exemplary global plug-in tree for a system is shown on the left side of the figure. This tree contains entries for three "Voices" plug-in items, namely "Junior", "Kathy", and "Albert". A personalized workspace, e.g. desktop, can be set up by each user of the system. When a user does so, a preferences file is created, which identifies the particular components that the user desires to have within the workspace. When the user accesses the software manager through that workspace, the preferences file is used to select only those components which are available within the workspace. In th example of FIG. 5, the user may have enabled the items "Junior" and "Albert", but not the item "Kathy". Consequently, the filtered plug-in tree for the workspace only contains entries for the two modules which are available through that workspace.

Conclusion

The present invention provides an enhanced user experience which allows a computer user to deal with system software elements as meaningful groups of related items that correspond to the products the user has purchased and to the features or benefits the user desires. The present invention also allows system software elements which rely on system file content to avoid costly run-time scans. More particularly, when a program is launched it can be provided with information about available components by accessing an entry in the software manager database, rather than having to scan the contents of the system files.

It will be appreciated that the present invention is not limited to these specific embodiments which have been described herein in order to facilitate an understanding of its underlying principles. For example, when a piece of application or operating system software is installed on a computer system employing the software manager of the present invention, information about that software might be captured by the software manager in the software manager configuration data base. Additionally, the above described software manager configuration database might be used to store, for example, information relating to operating environment changes a user might make, thus allowing the user to, for example, undo such changes later in time. The scope of the invention, therefore, is defined by the claims which are appended hereto, rather than the foregoing description, and all equivalents which are consistent with the meaning of the claims are intended to be embraced therein.

We claim:

1. A software manager enabling a computer user to administer software components within a computer operating system, comprising:

a configuration database storing information including a prevailing state and a dependency listing for each of said software components, the dependency listing for a given software component describing interdependencies between the given software component and other aspects of the computer operating system;

a user interface allowing said computer user to view said stored information and permitting said user to specify changes to said prevailing states; and a software manager server communicating with said user interface and said configuration database, for effecting said user specified changes and for updating said stored information to reflect said changes.

2. The software manager of claim 1, wherein said prevailing states indicate which of said software components are installed and enabled.

3. The software manager of claim 1, wherein said prevailing states indicate locations of said software components within a hierarchical filing system associated with said computer operating system.

4. The software manager of claim 1, wherein said user specified changes comprise enabling and disabling of previously installed software components.

5. The software manager of claim 1, wherein said user specified changes comprise deinstallation of previously installed software components and installation of additional software components.

6. The software manager of claim 1, wherein said user specified changes comprise movement of said software components within a hierarchical filing system associated with said computer operating system.

7. The software manager of claim 1, wherein said components within said operating system comprise independent system core modules and associated dependent system plug-in modules.

8. The software manager of claim 1, wherein said components within said operating system comprise independent application products and associated dependent application features.

9. The software manager of claim 1, wherein said stored information is presented to said user for viewing in accordance with user specified criteria.

10. The software manager of claim 9, wherein said user is presented with information corresponding to logical groupings of related software components, wherein said related software components are grouped together according to category and type.

11. The software manager of claim 1, further comprising at least one software manager plug-in providing an interface between an associated one of said software components and said software manager server, whereby said one associated software component requests and receives notification of certain changes in said information stored in said configuration database.

12. A method for managing software components of a computer operating system, comprising the steps of:

- establishing a database of software components within said operating system, said database including a prevailing state and a dependency listing for each of said software components, the dependency listing for a given software component describing interdependencies between the given software component and other aspects of the computer operating system;
- displaying a user interface in which related software components are grouped together in a manner which identifies their relationships;
- permitting a user of the computer operating system to specify, via the user interface, changes to the prevailing states of the software components;
- implementing the user-specified changes; and
- updating the database to reflect the user-specified changes.

13. The software manager of claim 1, wherein the dependency listing for a given software component describes a relationship between the given software component and at least one other software component in the computer operating system.

14. The software manager of claim 1, wherein the dependency listing for a given software component describes a relationship between the given software component and a set of system files associated with the computer operating system.

15. The software manager of claim 1, wherein said configuration database comprises a component tree describing a hierarchy of installed software components, a plug-in tree listing items tracked by software manager plug-ins and an item tree describing properties of the items tracked by the software manager plug-ins.

16. The software manager of claim 1, wherein said user interface permits said computer user to return to a core installation for a particular software component.

17. The software manager of claim 1, wherein said computer operating system permits multiple user environments and wherein said software manager filters a global configuration database to provide ephemeral user-specific configuration databases for the user environments.

18. The method of claim 12, further comprising the step of providing at least one software manager plug-in whereby an associated software component can request and receive notification of certain changes in the information stored in said database.

19. The method of claim 12, wherein a dependency listing for a given software component describes a relationship between the given software component and at least one other software component in the computer operating system.

20. The method of claim 12, wherein a dependency listing for a given software component describes a relationship between the given software component and a set of system files associated with the computer operating system.

* * * * *